US012803288B2

(12) United States Patent
Oki

(10) Patent No.: US 12,803,288 B2
(45) Date of Patent: Nov. 17, 2026

(54) INFORMATION PROCESSING METHOD, INFORMATION PROCESSING APPARATUS, AND NON-TRANSITORY COMPUTER READABLE MEDIUM

(71) Applicant: TOYOTA JIDOSHA KABUSHIKI KAISHA, Aichi-ken (JP)

(72) Inventor: Hiroshi Oki, Seto (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 379 days.

(21) Appl. No.: 18/663,068

(22) Filed: May 14, 2024

(65) Prior Publication Data

US 2024/0388098 A1 Nov. 21, 2024

(30) Foreign Application Priority Data

May 15, 2023 (JP) ................................ 2023-080233

(51) Int. Cl.
*H02J 3/38* (2026.01)
*H02J 3/00* (2026.01)

(52) U.S. Cl.
CPC ................ *H02J 3/38* (2013.01); *H02J 3/004* (2020.01)

(58) Field of Classification Search
CPC ................. H02J 3/38; H02J 3/004; H02J 3/32
See application file for complete search history.

(56) References Cited

U.S. PATENT DOCUMENTS

2012/0083927 A1* 4/2012 Nakamura ............... F24F 11/30 700/278

FOREIGN PATENT DOCUMENTS

| | | | |
|---|---|---|---|
| JP | 2005-012912 | A | 1/2005 |
| JP | 2006-050834 | A | 2/2006 |
| JP | 2021-087330 | A | 6/2021 |
| WO | 2020/026874 | A1 | 2/2020 |

* cited by examiner

*Primary Examiner* — Charles R Kasenge
(74) *Attorney, Agent, or Firm* — HAUPTMAN HAM, LLP

(57) ABSTRACT

An information processing method by an information processing apparatus, which includes a controller, a communication interface, and a memory, and can communicate with a power generator and a storage battery via the communication interface, includes upon detecting an error between a forecast and an actual result in electric power supply and demand, determining whether the error indicates electric power is insufficient, and upon determining that the error indicates the electric power is insufficient, procuring electric power by one of first and second methods with a lower electric power procurement cost or carbon dioxide emission, by determining which of the first method of generating electric power by the power generator and the second method of purchasing electric power from an external source and discharging the electric power from the storage battery has the lower electric power procurement cost or carbon dioxide emission.

11 Claims, 4 Drawing Sheets

INFORMATION PROCESSING METHOD, INFORMATION PROCESSING APPARATUS, AND NON-TRANSITORY COMPUTER READABLE MEDIUM

CROSS-REFERENCE TO RELATED APPLICATION

This application claims priority to Japanese Patent Application No. 2023-080233, filed on May 15, 2023, the entire contents of which are incorporated herein by reference.

TECHNICAL FIELD

The present disclosure relates to an information processing method, an information processing apparatus, and a program.

BACKGROUND

Systems that reasonably forecast, at the time of reservation, the amount of externally procured electrical energy reservation to minimize procurement cost or maximize revenue are known. For example, see Patent Literature (PTL) 1. The system optimizes the amount of externally procured electrical energy under the probability distribution of demand for a time interval subject to planning, which is calculated from the probability distribution of demand forecast errors. The system optimizes the amount of externally procured electrical energy under the probability distribution of available power generation capacity for a time interval subject to planning, which is calculated from the probability distribution of available power generation capacity forecast errors. The system calculates the amount of externally procured electrical energy that minimizes an expected value of the cost of the externally procured electrical energy.

CITATION LIST

Patent Literature

PTL 1: JP 2006-050834 A

SUMMARY

The above technology minimizes the cost of externally procured electrical energy by combining power generation by a power generator. However, combining other devices than the power generator is not described and there is room for improvement.

It would be helpful to achieve simultaneous equivalence even when an error occurs between a forecast and an actual result in electric power supply and demand during operation of facilities (e.g., a power generator or a storage battery). The term "simultaneous equivalence" indicates that the amount of electricity produced (i.e., supply) and the amount of electricity consumed (i.e., demand) are equal at the same time. If the supply and the demand do not always coincide, the quality (e.g., frequency) of electricity is disturbed and the electricity is not supplied normally.

An information processing method according to an embodiment of the present disclosure is an information processing method by an information processing apparatus including a controller, a communication interface, and a memory, the information processing apparatus being configured to be able to communicate with a power generator and a storage battery via the communication interface, the information processing method including:

upon detecting an error between a forecast and an actual result in electric power supply and demand, determining whether the error indicates that electric power is insufficient;

upon determining that the error indicates that the electric power is insufficient, procuring electric power by one of first and second methods with a lower electric power procurement cost or carbon dioxide emission, by determining which of the first and second methods has the lower electric power procurement cost or carbon dioxide emission, the first method being a method of generating electric power by the power generator, the second method being a method of purchasing electric power from an external source and discharging the electric power from the storage battery; and upon determining that the error indicates that the electric power is surplus, procuring electric power by one of third and fourth methods with a lower electric power procurement cost or carbon dioxide emission, by determining which of the third and fourth methods has the lower electric power procurement cost or carbon dioxide emission, the third method being a method of reducing the amount of electric power generated by the power generator, the fourth method being a method of charging the storage battery with surplus electric power and reducing a purchase amount of electric power.

An information processing apparatus according to an embodiment of the present disclosure is an information processing apparatus including:

a controller;

a communication interface; and a memory, wherein the information processing apparatus is configured to be able to communicate with a power generator and a storage battery via the communication interface, and the controller is configured to execute operations including:

upon detecting an error between a forecast and an actual result in electric power supply and demand, determining whether the error indicates that electric power is insufficient;

upon determining that the error indicates that the electric power is insufficient, procuring electric power by one of first and second methods with a lower electric power procurement cost or carbon dioxide emission, by determining which of the first and second methods has the lower electric power procurement cost or carbon dioxide emission, the first method being a method of generating electric power by the power generator, the second method being a method of purchasing electric power from an external source and discharging the electric power from the storage battery; and upon determining that the error indicates that the electric power is surplus, procuring electric power by one of third and fourth methods with a lower electric power procurement cost or carbon dioxide emission, by determining which of the third and fourth methods has the lower electric power procurement cost or carbon dioxide emission, the third method being a method of reducing the amount of electric power generated by the power generator, the fourth method being a method of charging the storage battery with surplus electric power and reducing a purchase amount of electric power.

A program according to an embodiment of the present disclosure is configured to cause a computer as an information processing apparatus to execute operations, the information processing apparatus including a controller, a communication interface, and a memory, the information processing apparatus being configured to be able to communicate with a power generator and a storage battery via the communication interface, the operations including:

upon detecting an error between a forecast and an actual result in electric power supply and demand, determining whether the error indicates that electric power is insufficient;

upon determining that the error indicates that the electric power is insufficient, procuring electric power by one of first and second methods with a lower electric power procurement cost or carbon dioxide emission, by determining which of the first and second methods has the lower electric power procurement cost or carbon dioxide emission, the first method being a method of generating electric power by the power generator, the second method being a method of purchasing electric power from an external source and discharging the electric power from the storage battery; and upon determining that the error indicates that the electric power is surplus, procuring electric power by one of third and fourth methods with a lower electric power procurement cost or carbon dioxide emission, by determining which of the third and fourth methods has the lower electric power procurement cost or carbon dioxide emission, the third method being a method of reducing the amount of electric power generated by the power generator, the fourth method being a method of charging the storage battery with surplus electric power and reducing a purchase amount of electric power.

According to an embodiment of the present disclosure, simultaneous equivalence can be achieved even when an error occurs between a forecast and an actual result in electric power supply and demand.

DETAILED DESCRIPTION

Figure 1:
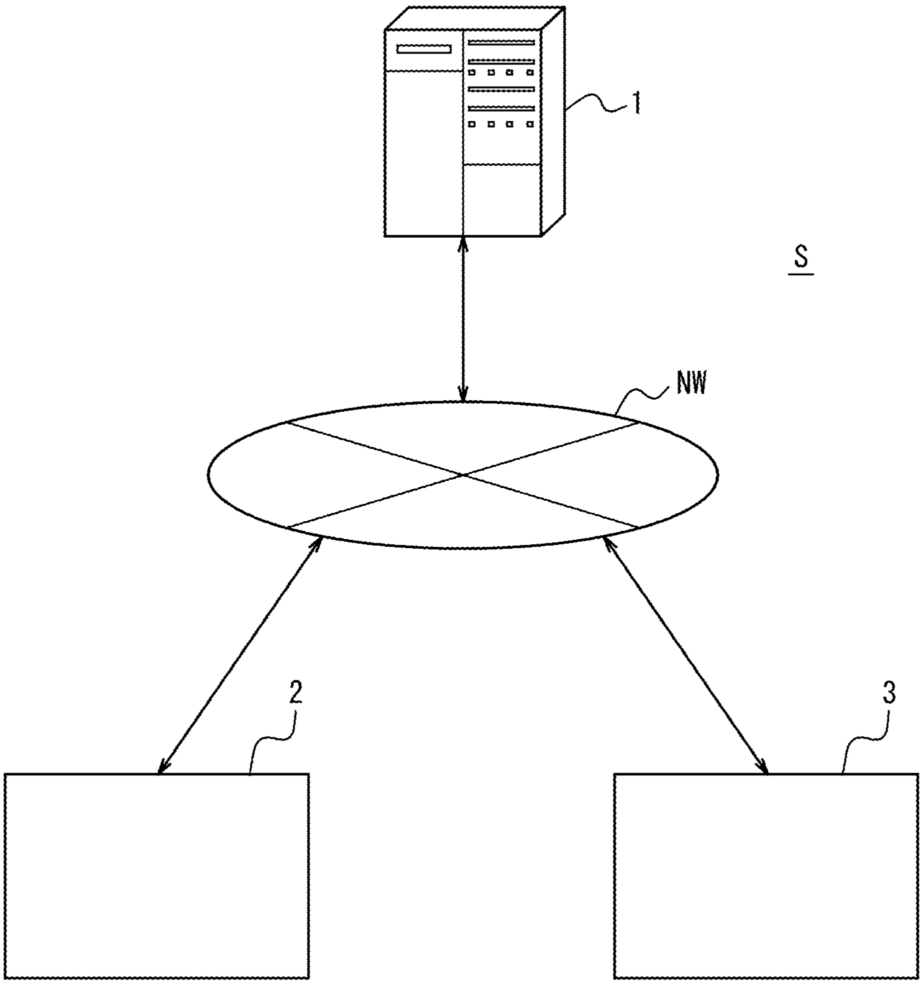
FIG. 1 is a schematic diagram of an information processing system.

FIG. 1 is a schematic diagram of an information processing system S according to the present embodiment. The information processing system S includes an information processing apparatus 1, a power generator 2, and a storage battery 3, which are communicably connected to each other via a network NW. The network NW includes, for example, a mobile communication network, a fixed communication network, or the Internet.

FIG. 1 illustrates one each of the information processing apparatus 1, the power generator 2, and the storage battery 3 for convenience of explanation. However, the numbers of information processing apparatuses 1, power generators 2, and storage batteries 3 are not limited to one. For example, processing to be executed by the information processing apparatus 1 according to the present embodiment may be executed by a plurality of distributed information processing apparatuses 1.

An outline of processing executed by the information processing apparatus 1 of the present embodiment will be described. Operations of a controller 11 of the information processing apparatus 1 include upon detecting an error between a forecast and an actual result in electric power supply and demand, determining whether the error indicates that electric power is insufficient, upon determining that the error indicates that the electric power is insufficient, procuring electric power by one of first and second methods with a lower electric power procurement cost or carbon dioxide emission, by determining which of the first and second methods has the lower electric power procurement cost or carbon dioxide emission, the first method being a method of generating electric power by the power generator 2, the second method being a method of purchasing electric power from an external source and discharging the electric power from the storage battery 3, and upon determining that the error indicates that the electric power is surplus, procuring electric power by one of third and fourth methods with a lower electric power procurement cost or carbon dioxide emission, by determining which of the third and fourth methods has the lower electric power procurement cost or carbon dioxide emission, the third method being a method of reducing the amount of electric power generated by the power generator 2, the fourth method being a method of charging the storage battery 3 with surplus electric power and reducing a purchase amount of electric power. With this configuration, even when an error occurs between a forecast and an actual result in electric power supply and demand, the information processing apparatus 1 can achieve simultaneous equivalence by using both the power generator 2 and the storage battery 3 to compensate for the error. Furthermore, the information processing apparatus 1 can reduce an electric power procurement cost or carbon dioxide emission.

The information processing apparatus 1 is an apparatus that controls the power generator 2 and the storage battery 3. The information processing apparatus 1 is a power conditioner as an example here. The information processing apparatus 1 supplies electric power to one or more consumers.

Figure 2:
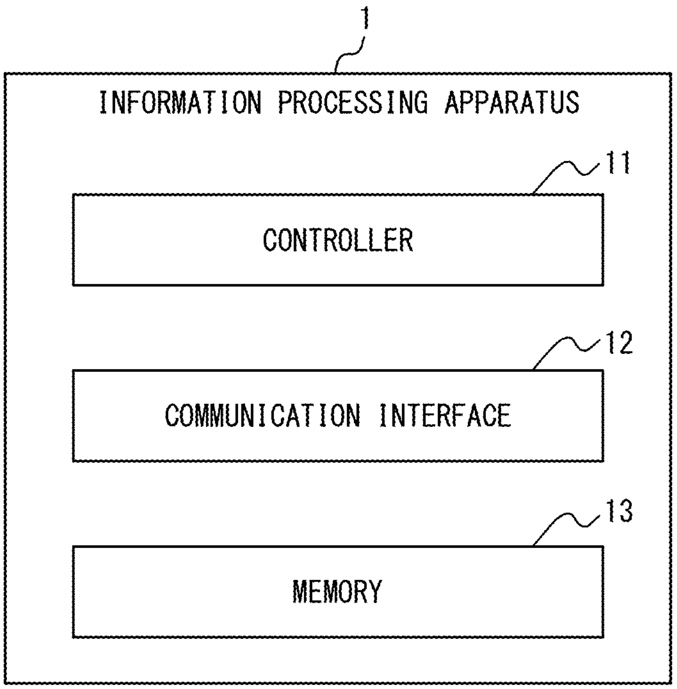
FIG. 2 is a block diagram illustrating a configuration of an information processing apparatus.

In FIG. 2, an internal configuration of the information processing apparatus 1 will be described in detail.

The information processing apparatus 1 includes the controller 11, a communication interface 12, and a memory 13. The components of the information processing apparatus 1 are communicably connected to one another via, for example, dedicated lines.

The controller 11 includes, for example, one or more general purpose processors including a Central Processing Unit (CPU) or a Micro Processing Unit (MPU). The controller 11 may include one or more dedicated processors that are dedicated to specific processing. The controller 11 may include one or more dedicated circuits instead of the processors. Examples of the dedicated circuits may include a Field-Programmable Gate Array (FPGA) and an Application Specific Integrated Circuit (ASIC). The controller 11 may include an Electronic Control Unit (ECU). The controller 11 transmits and receives any information via the communication interface 12.

The communication interface 12 includes one or more communication modules for connection to the network NW that conform to wired or wireless Local Area Network (LAN) standards. The communication interface 12 may include a module conforming to one or more mobile communication standards including the Long Term Evolution (LTE) standard, the 4th Generation (4G) standard, or the 5th Generation (5G) standard. The communication interface 12 may include one or more communication modules conforming to near field communication standards or specifications, including Bluetooth® (Bluetooth is a registered trademark in Japan, other countries, or both), AirDrop® (AirDrop is a registered trademark in Japan, other countries, or both), IrDA, ZigBee® (ZigBee is a registered trademark in Japan, other countries, or both), Felica® (Felica is a registered trademark in Japan, other countries, or both), or RFID. The communication interface 12 transmits and receives any information via the network NW.

The memory 13 includes, for example, a semiconductor memory, a magnetic memory, an optical memory, or a combination of at least two of these, but is not limited to these. The semiconductor memory is, for example, RAM or ROM. The RAM is, for example, SRAM or DRAM. The ROM is, for example, EEPROM. The memory 13 may function as, for example, a main memory, an auxiliary memory, or a cache memory. The memory 13 may store information resulting from analysis or processing performed by the controller 11. The memory 13 may store various types of information or the like regarding operations and control of the information processing apparatus 1. The memory 13 may store a system program, an application program, embedded software, and the like. The memory 13 may be provided outside the information processing apparatus 1 and accessed by the information processing apparatus 1.

The power generator 2 is an electric power supply device that generates electrical energy. The power generator 2 here is a fuel cell. As an alternative example, the power generator 2 may be any device that can generate electric power.

The storage battery 3 is a battery that can be used repeatedly by recharging. The storage battery 3 may be referred to as a secondary battery or a rechargeable battery.

Figure 3:
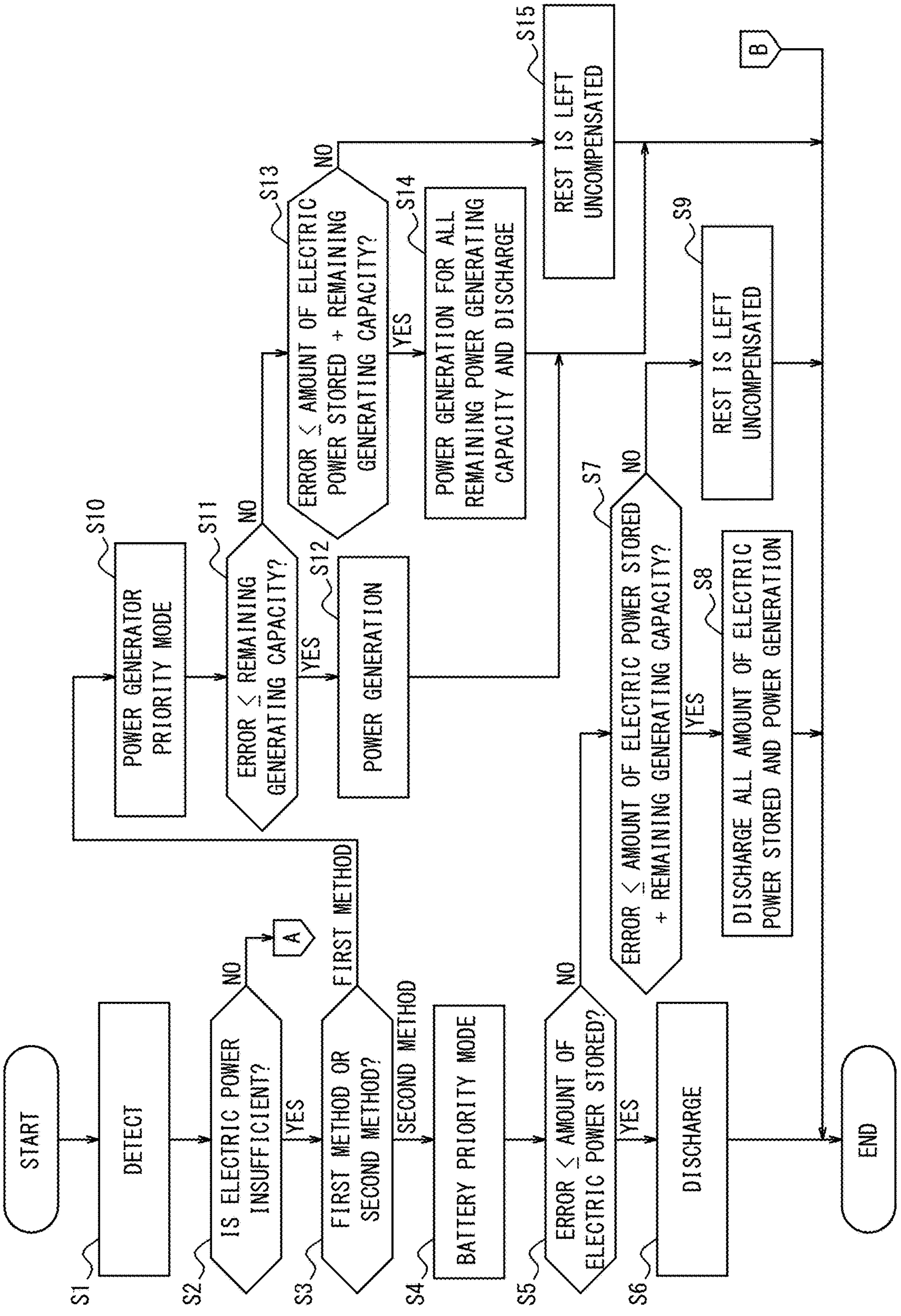
FIG. 3 is a flowchart illustrating first operations of the information processing apparatus.
Figure 4:
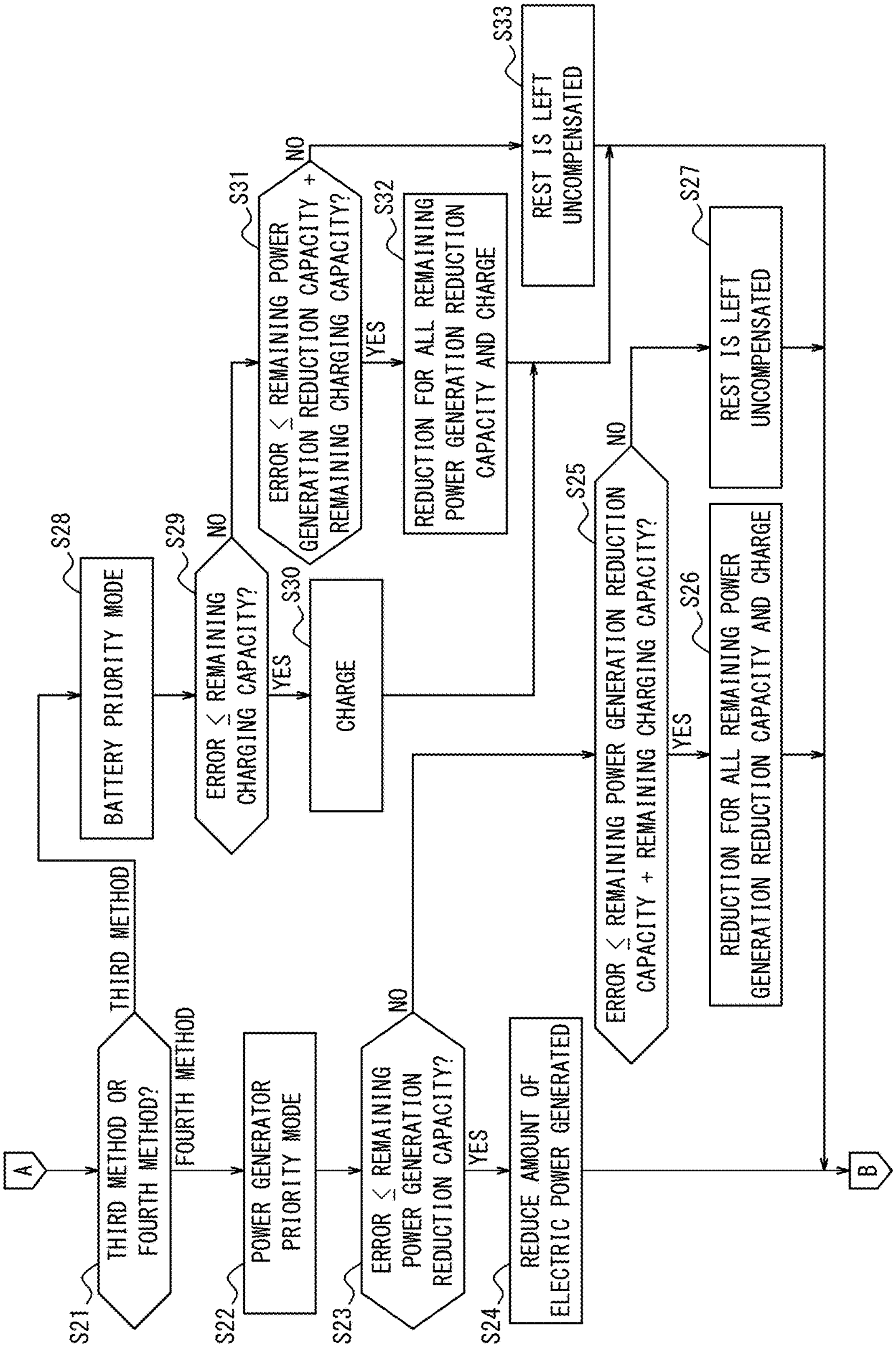
FIG. 4 is a flowchart illustrating second operations of the information processing apparatus.

An information processing method by the information processing apparatus 1 will be described in detail below with reference to FIGS. 3 and 4.

In step S1, the controller 11 of the information processing apparatus 1 detects an error between a forecast and an actual result in electric power supply and demand. Data on the forecast and the actual result is acquired by the controller 11 and stored in the memory 13.

In step S2, the controller 11 determines whether the error indicates that electric power is insufficient.

When Yes in step S2, the controller 11 determines in step S3 which of a first method of generating electric power by the power generator 2 and a second method of purchasing electric power from an external source (e.g. system) and discharging the electric power from the storage battery 3 has a lower electric power procurement cost or carbon dioxide emission. Which of an electric power procurement cost and a carbon dioxide emission is compared between the first and second methods can be set arbitrarily.

A method of calculating the electric power procurement cost or the carbon dioxide emission is arbitrary. For example, the carbon dioxide emission may be calculated by the following methods.

(1) In a case in which electric power is generated, the controller 11 calculates the amount of carbon dioxide emission per kWh from the amount of carbon dioxide emission and power generation efficiency when a fuel of a fuel cell is burned, and multiplies the calculated amount of carbon dioxide emission per kWh by the amount of electric power generated.

(2) In a case in which electric power is purchased, for example, the following website publishes the amount of carbon dioxide emission per kWh of electric power purchased, on a supplier-by-supplier basis. The controller 11 multiplies the published amount of carbon dioxide emission per kWh by the amount of electric power purchased.

https://ghg-santeikohyo.env.go.jp/files/calc/r05_coefficient.pdf (3) In a case in which electric power is sold, the controller 11 deducts a value of multiplying the amount of carbon dioxide emission per kWh in the above case in which electric power is generated by the amount of electric power sold.

Upon determining that the second method has the lower electric power procurement cost or carbon dioxide emission, the controller 11 sets, in step S4, a battery priority mode. The name of the mode can be set arbitrarily.

In step S5, the controller 11 determines whether the error between the forecast and the actual result (hereinafter referred to simply as "error") is less than or equal to the amount of electric power stored in the storage battery 3.

When Yes in step S5, in step S6 for the error, the controller 11 has the storage battery 3 discharge electric power. Specifically, the controller 11 has the storage battery 3 discharge electric power so as to compensate for the error.

When No in step S5 (i.e., when the error exceeds the amount of electric power stored), the controller 11 determines in step S7 whether the error is less than or equal to the sum of the amount of electric power stored and a remaining generating capacity of the power generator 2.

When Yes in step S7, the controller 11 performs, in step S8 for the error, discharge of all the amount of electric power stored in the storage battery 3 and power generation by the power generator 2, to compensate for the error.

When No in step S7, the controller 11 performs, in step S9 for the error, power generation by the power generator 2 for all the remaining generating capacity and discharge of all the amount of electric power stored in the storage battery 3. In this case, the error cannot be completely compensated, so the rest is left uncompensated.

Upon determining in step S3 that the first method has the lower electric power procurement cost or carbon dioxide emission, the controller 11 sets, in step S10, a power generator priority mode.

In step S11, the controller 11 determines whether the error is less than or equal to the remaining generating capacity of the power generator 2.

When Yes in step S11, in step S12 for the error, the controller 11 has the power generator 2 generate electric power. The error is thereby compensated.

When No in step S11, the controller 11 determines in step S13 whether the error is less than or equal to the sum of the amount of electric power stored in the storage battery 3 and the remaining generating capacity of the power generator 2.

When Yes in step S13, the controller 11 performs, in step S14 for the error, power generation by the power generator 2 for all the remaining generating capacity and discharge from the storage battery 3.

When No in step S13, the controller 11 performs, in step S15 for the error, power generation by the power generator 2 for all the remaining generating capacity and discharge of all the amount of electric power stored in the storage battery 3. The rest of the error that is not compensated is left uncompensated.

When No in step S2 (i.e., when electric power is surplus), the controller 11 determines in step S21 which of a third method of reducing the amount of electric power generated by the power generator 2 and a fourth method of charging the storage battery 3 with surplus electric power and reducing a purchase amount of electric power has a lower electric power procurement cost or carbon dioxide emission.

Upon determining in step S21 that the fourth method has the lower electric power procurement cost or carbon dioxide emission, the controller 11 sets, in step S22, a power generator priority mode.

In step S23, the controller 11 determines whether the error is less than or equal to a remaining power generation reduction capacity of the power generator 2.

When Yes in step S23, for the error, the controller 11 has the power generator 2 reduce the amount of electric power generated by the power generator 2. The error is thereby compensated.

When No in step S23, the controller 11 determines in step S25 whether the error is less than or equal to the sum of the remaining power generation reduction capacity of the power generator 2 and a remaining charging capacity of the storage battery 3.

When Yes in step S25, the controller 11 performs, in step S26 for the error, reduction in the amount of electric power generated by the power generator 2 for all the remaining power generation reduction capacity and charge of the storage battery 3.

When No in step S25, the controller 11 performs, in step S27 for the error, reduction in the amount of electric power generated by the power generator 2 for all the remaining power generation reduction capacity and charge of the storage battery 3 for all the remaining charging capacity. The error that is not compensated is left uncompensated.

Upon determining in step S21 that the third method has the lower electric power procurement cost or carbon dioxide emission, the controller 11 sets, in step S28, a battery priority mode.

In step S29, the controller 11 determines whether the error is less than or equal to the remaining charging capacity of the storage battery 3.

When Yes in step S29, in step S30, the controller 11 has the storage battery 3 charge electric power.

When No in step S29, the controller 11 determines in step S31 whether the error is less than or equal to the sum of the remaining power generation reduction capacity of the power generator 2 and the remaining charging capacity of the storage battery 3.

When Yes in step S31, the controller 11 performs, in step S32 for the error, reduction in the amount of electric power generated by the power generator 2 for all the remaining power generation reduction capacity and charge of the storage battery 3.

When No in step S31, the controller 11 performs, in step S33 for the error, reduction in the amount of electric power generated by the power generator 2 for all the remaining power generation reduction capacity and charge of the storage battery 3 for all the remaining charging capacity. The error that is not compensated is left uncompensated.

As described above, according to the present embodiment, the operations of the controller 11 of the information processing apparatus 1 include upon detecting an error between a forecast and an actual result in electric power supply and demand, determining whether the error indicates that electric power is insufficient, upon determining that the error indicates that the electric power is insufficient, procuring electric power by one of the first and second methods with a lower electric power procurement cost or carbon dioxide emission, by determining which of the first and second methods has the lower electric power procurement cost or carbon dioxide emission, the first method being a method of generating electric power by the power generator 2, the second method being a method of purchasing electric power from an external source and discharging the electric power from the storage battery 3, and upon determining that the error indicates that the electric power is surplus, procuring electric power by one of the third and fourth methods with a lower electric power procurement cost or carbon dioxide emission, by determining which of the third and fourth methods has the lower electric power procurement cost or carbon dioxide emission, the third method being a method of reducing the amount of electric power generated by the power generator 2, the fourth method being a method of charging the storage battery 3 with surplus electric power and reducing a purchase amount of electric power. With this configuration, even when an error occurs between a forecast and an actual result in electric power supply and demand, the information processing apparatus 1 can achieve simultaneous equivalence by using both the power generator 2 and the storage battery 3 to compensate for the error. Furthermore, the information processing apparatus 1 can reduce an electric power procurement cost or carbon dioxide emission.

According to the present embodiment, the operations of the controller 11 include upon determining that the second method has a lower electric power procurement cost or carbon dioxide emission, comparing the error with the amount of electric power stored in the storage battery 3, and upon determining that the error is less than or equal to the amount of electric power stored, performing, for the error, discharge from the storage battery 3. The operations of the controller 11 include upon determining that the error exceeds the amount of electric power stored, comparing the error with the sum of the amount of electric power stored and a remaining generating capacity of the power generator 2, and upon determining that the error is less than or equal to the sum, performing, for the error, discharge of all the amount of electric power stored in the storage battery 3 and power generation by the power generator 2. With this configuration, the information processing apparatus 1 can achieve simultaneous equivalence by compensating for the error.

According to the present embodiment, the operations of the controller 11 include upon determining that the first method has a lower electric power procurement cost or carbon dioxide emission, comparing the error with the remaining generating capacity of the power generator 2, and upon determining that the error is less than or equal to the remaining generating capacity, performing, for the error, power generation by the power generator 2. The operations of the controller 11 include upon determining that the error exceeds the remaining generating capacity, comparing the error with the sum of the amount of electric power stored in the storage battery 3 and the remaining generating capacity of the power generator 2, and upon determining that the error is less than or equal to the sum, performing, for the error, power generation by the power generator 2 for all the remaining generating capacity and discharge from the storage battery 3. With this configuration, the information processing apparatus 1 can achieve simultaneous equivalence by compensating for the error.

According to the present embodiment, the operations of the controller 11 include upon determining that the fourth method has a lower electric power procurement cost, comparing the error with a remaining power generation reduction capacity of the power generator 2, and upon determining that the error is less than or equal to the remaining power generation reduction capacity, performing, for the error, reduction in the amount of electric power generated by the power generator 2. The operations of the controller 11 include upon determining that the error exceeds the remaining power generation reduction capacity, comparing the error with the sum of the remaining power generation reduction capacity of the power generator 2 and a remaining charging capacity of the storage battery 3, and upon determining that the error is less than or equal to the sum, performing, for the error, reduction in the amount of electric power generated by the power generator 2 for all the remaining power generation reduction capacity and charge of the storage battery 3. With this configuration, the information processing apparatus 1 can achieve simultaneous equivalence by compensating for the error.

According to the present embodiment, the operations of the controller 11 include upon determining that the third method has a lower electric power procurement cost, comparing the error with the remaining charging capacity of the storage battery 3, and upon determining that the error is less than or equal to the remaining charging capacity, performing, for the error, charge of the storage battery 3. The operations of the controller 11 further include upon determining that the error exceeds the remaining charging capacity, comparing the error with the sum of the remaining power generation reduction capacity of the power generator 2 and the remaining charging capacity of the storage battery 3, and upon determining that the error is less than or equal to the sum, performing, for the error, reduction in the amount of electric power generated by the power generator 2 for all the remaining power generation reduction capacity and charge of the storage battery 3. With this configuration, the information processing apparatus 1 can achieve simultaneous equivalence by compensating for the error.

While the present disclosure has been described with reference to the drawings and examples, it should be noted that various modifications and revisions may be implemented by those skilled in the art based on the present disclosure. Other modifications can be made without departing from the spirit of the present disclosure. For example, functions or the like included in each means or each step can be rearranged without logical inconsistency, and a plurality of means or steps can be combined into one or divided.

For example, in the aforementioned embodiment, a program configured to execute all or some of the functions or processing of the information processing apparatus 1 can be recorded on a computer readable recording medium. The computer readable recording medium includes a non-transitory computer readable medium and is, for example, a magnetic recording apparatus, an optical disc, a magneto-optical recording medium, or a semiconductor memory. The distribution of the program is performed by, for example, sale, transfer, or rental of a portable recording medium such as a digital versatile disc (DVD) or a compact disc read only memory (CD-ROM) on which the program is recorded. The program may also be distributed by storing the program in a storage of any server and transmitting the program from any server to another computer. The program may be provided as a program product. The present disclosure can also be implemented as a program executable by a processor.

Examples of some embodiments of the present disclosure are described below. However, it should be noted that the embodiments of the present disclosure are not limited to these examples.

[Appendix 1] An information processing method by an information processing apparatus including a controller, a communication interface, and a memory, the information processing apparatus being configured to be able to communicate with a power generator and a storage battery via the communication interface, the information processing method comprising:

upon detecting an error between a forecast and an actual result in electric power supply and demand, determining whether the error indicates that electric power is insufficient;

upon determining that the error indicates that the electric power is insufficient, procuring electric power by one of first and second methods with a lower electric power procurement cost or carbon dioxide emission, by determining which of the first and second methods has the lower electric power procurement cost or carbon dioxide emission, the first method being a method of generating electric power by the power generator, the second method being a method of purchasing electric power from an external source and discharging the electric power from the storage battery; and upon determining that the error indicates that the electric power is surplus, procuring electric power by one of third and fourth methods with a lower electric power procurement cost or carbon dioxide emission, by determining which of the third and fourth methods has the lower electric power procurement cost or carbon dioxide emission, the third method being a method of reducing an amount of electric power generated by the power generator, the fourth method being a method of charging the storage battery with surplus electric power and reducing a purchase amount of electric power.

[Appendix 2] The information processing method according to appendix 1, wherein when it is determined that the second method has the lower electric power procurement cost or carbon dioxide emission, the error is compared with an amount of electric power stored in the storage battery, and when it is determined that the error is less than or equal to the amount of electric power stored, for the error, discharge from the storage battery is performed.

[Appendix 3] The information processing method according to appendix 2, wherein when it is determined that the error exceeds the amount of electric power stored, the error is compared with a sum of the amount of electric power stored and a remaining generating capacity of the power generator, and when it is determined that the error is less than or equal to the sum, for the error, discharge of all the amount of electric power stored in the storage battery and power generation by the power generator are performed.

[Appendix 4] The information processing method according to any one of appendices 1 to 3, wherein when it is determined that the first method has the lower electric power procurement cost or carbon dioxide emission, the error is compared with a remaining generating capacity of the power generator, and when it is determined that the error is less than or equal to the remaining generating capacity, for the error, power generation by the power generator is performed.

[Appendix 5] The information processing method according to appendix 4, wherein when it is determined that the error exceeds the remaining generating capacity, the error is compared with a sum of an amount of electric power stored in the storage battery and the remaining generating capacity of the power generator, and when it is determined that the error is less than or equal to the sum, for the error, power generation by the power generator for all the remaining generating capacity and discharge from the storage battery are performed.

[Appendix 6] The information processing method according to any one of appendices 1 to 5, wherein when it is determined that the fourth method has the lower electric power procurement cost, the error is compared with a remaining power generation reduction capacity of the power generator, and when it is determined that the error is less than or equal to the remaining power generation reduction capacity, for the error, reduction in an amount of electric power generated by the power generator is performed.

[Appendix 7] The information processing method according to appendix 6, wherein when it is determined that the error exceeds the remaining power generation reduction capacity, the error is compared with a sum of the remaining power generation reduction capacity of the power generator and a remaining charging capacity of the storage battery, and when it is determined that the error is less than or equal to the sum, for the error, reduction in an amount of electric power generated by the power generator for all the remaining power generation reduction capacity and charge of the storage battery are performed.

[Appendix 8] The information processing method according to any one of appendices 1 to 7, wherein when it is determined that the third method has the lower electric power procurement cost, the error is compared with a remaining charging capacity of the storage battery, and when it is determined that the error is less than or equal to the remaining charging capacity, for the error, charge of the storage battery is performed.

[Appendix 9] The information processing method according to appendix 8, wherein when it is determined that the error exceeds the remaining charging capacity, the error is compared with a sum of a remaining power generation reduction capacity of the power generator and the remaining charging capacity of the storage battery, and when it is determined that the error is less than or equal to the sum, for the error, reduction in an amount of electric power generated by the power generator for all the remaining power generation reduction capacity and charge of the storage battery are performed.

[Appendix 10] An information processing apparatus comprising:

a controller;

a communication interface; and a memory, wherein the information processing apparatus is configured to be able to communicate with a power generator and a storage battery via the communication interface, and the controller is configured to execute operations comprising:

upon detecting an error between a forecast and an actual result in electric power supply and demand, determining whether the error indicates that electric power is insufficient;

upon determining that the error indicates that the electric power is insufficient, procuring electric power by one of first and second methods with a lower electric power procurement cost or carbon dioxide emission, by determining which of the first and second methods has the lower electric power procurement cost or carbon dioxide emission, the first method being a method of generating electric power by the power generator, the second method being a method of purchasing electric power from an external source and discharging the electric power from the storage battery; and upon determining that the error indicates that the electric power is surplus, procuring electric power by one of third and fourth methods with a lower electric power procurement cost or carbon dioxide emission, by determining which of the third and fourth methods has the lower electric power procurement cost or carbon dioxide emission, the third method being a method of reducing an amount of electric power generated by the power generator, the fourth method being a method of charging the storage battery with surplus electric power and reducing a purchase amount of electric power.

[Appendix 11] A program configured to cause a computer as an information processing apparatus to execute operations, the information processing apparatus including a controller, a communication interface, and a memory, the information processing apparatus being configured to be able to communicate with a power generator and a storage battery via the communication interface, the operations comprising:

upon detecting an error between a forecast and an actual result in electric power supply and demand, determining whether the error indicates that electric power is insufficient;

upon determining that the error indicates that the electric power is insufficient, procuring electric power by one of first and second methods with a lower electric power procurement cost or carbon dioxide emission, by determining which of the first and second methods has the lower electric power procurement cost or carbon dioxide emission, the first method being a method of generating electric power by the power generator, the second method being a method of purchasing electric power from an external source and discharging the electric power from the storage battery; and upon determining that the error indicates that the electric power is surplus, procuring electric power by one of third and fourth methods with a lower electric power procurement cost or carbon dioxide emission, by determining which of the third and fourth methods has the lower electric power procurement cost or carbon dioxide emission, the third method being a method of reducing an amount of electric power generated by the power generator, the fourth method being a method of charging the storage battery with surplus electric power and reducing a purchase amount of electric power.

The invention claimed is:

1. An information processing method by an information processing apparatus including a controller, a communication interface, and a memory, the information processing apparatus being configured to be able to communicate with a power generator and a storage battery via the communication interface, the information processing method comprising:

upon detecting an error between a forecast and an actual result in electric power supply and demand, determining whether the error indicates that electric power is insufficient;

upon determining that the error indicates that the electric power is insufficient, procuring electric power by one of first and second methods with a lower electric power procurement cost or carbon dioxide emission, by determining which of the first and second methods has the lower electric power procurement cost or carbon dioxide emission, the first method being a method of generating electric power by the power generator, the second method being a method of purchasing electric power from an external source and discharging the electric power from the storage battery; and upon determining that the error indicates that the electric power is surplus, procuring electric power by one of third and fourth methods with a lower electric power procurement cost or carbon dioxide emission, by determining which of the third and fourth methods has the lower electric power procurement cost or carbon dioxide emission, the third method being a method of reducing an amount of electric power generated by the power generator, the fourth method being a method of charging the storage battery with surplus electric power and reducing a purchase amount of electric power.

2. The information processing method according to claim 1, wherein when it is determined that the second method has the lower electric power procurement cost or carbon dioxide emission, the error is compared with an amount of electric power stored in the storage battery, and when it is determined that the error is less than or equal to the amount of electric power stored, for the error, discharge from the storage battery is performed.

3. The information processing method according to claim 2, wherein when it is determined that the error exceeds the amount of electric power stored, the error is compared with a sum of the amount of electric power stored and a remaining generating capacity of the power generator, and when it is determined that the error is less than or equal to the sum, for the error, discharge of all the amount of electric power stored in the storage battery and power generation by the power generator are performed.

4. The information processing method according to claim 1, wherein when it is determined that the first method has the lower electric power procurement cost or carbon dioxide emission, the error is compared with a remaining generating capacity of the power generator, and when it is determined that the error is less than or equal to the remaining generating capacity, for the error, power generation by the power generator is performed.

5. The information processing method according to claim 4, wherein when it is determined that the error exceeds the remaining generating capacity, the error is compared with a sum of an amount of electric power stored in the storage battery and the remaining generating capacity of the power generator, and when it is determined that the error is less than or equal to the sum, for the error, power generation by the power generator for all the remaining generating capacity and discharge from the storage battery are performed.

6. The information processing method according to claim 1, wherein when it is determined that the fourth method has the lower electric power procurement cost, the error is compared with a remaining power generation reduction capacity of the power generator, and when it is determined that the error is less than or equal to the remaining power generation reduction capacity, for the error, reduction in an amount of electric power generated by the power generator is performed.

7. The information processing method according to claim 6, wherein when it is determined that the error exceeds the remaining power generation reduction capacity, the error is compared with a sum of the remaining power generation reduction capacity of the power generator and a remaining charging capacity of the storage battery, and when it is determined that the error is less than or equal to the sum, for the error, reduction in an amount of electric power generated by the power generator for all the remaining power generation reduction capacity and charge of the storage battery are performed.

8. The information processing method according to claim 1, wherein when it is determined that the third method has the lower electric power procurement cost, the error is compared with a remaining charging capacity of the storage battery, and when it is determined that the error is less than or equal to the remaining charging capacity, for the error, charge of the storage battery is performed.

9. The information processing method according to claim 8, wherein when it is determined that the error exceeds the remaining charging capacity, the error is compared with a sum of a remaining power generation reduction capacity of the power generator and the remaining charging capacity of the storage battery, and when it is determined that the error is less than or equal to the sum, for the error, reduction in an amount of electric power generated by the power generator for all the remaining power generation reduction capacity and charge of the storage battery are performed.

10. An information processing apparatus comprising:

a controller;

a communication interface; and a memory, wherein the information processing apparatus is configured to be able to communicate with a power generator and a storage battery via the communication interface, and the controller is configured to execute operations comprising:

upon detecting an error between a forecast and an actual result in electric power supply and demand, determining whether the error indicates that electric power is insufficient;

upon determining that the error indicates that the electric power is insufficient, procuring electric power by one of first and second methods with a lower electric power procurement cost or carbon dioxide emission, by determining which of the first and second methods has the lower electric power procurement cost or carbon dioxide emission, the first method being a method of generating electric power by the power generator, the second method being a method of purchasing electric power from an external source and discharging the electric power from the storage battery; and upon determining that the error indicates that the electric power is surplus, procuring electric power by one of third and fourth methods with a lower electric power procurement cost or carbon dioxide emission, by determining which of the third and fourth methods has the lower electric power procurement cost or carbon dioxide emission, the third method being a method of reducing an amount of electric power generated by the power generator, the fourth method being a method of charging the storage battery with surplus electric power and reducing a purchase amount of electric power.

11. A non-transitory computer readable medium storing a program configured to cause a computer as an information processing apparatus to execute operations, the information processing apparatus including a controller, a communication interface, and a memory, the information processing apparatus being configured to be able to communicate with a power generator and a storage battery via the communication interface, the operations comprising:

upon detecting an error between a forecast and an actual result in electric power supply and demand, determining whether the error indicates that electric power is insufficient;

upon determining that the error indicates that the electric power is insufficient, procuring electric power by one of first and second methods with a lower electric power procurement cost or carbon dioxide emission, by determining which of the first and second methods has the lower electric power procurement cost or carbon dioxide emission, the first method being a method of generating electric power by the power generator, the second method being a method of purchasing electric power from an external source and discharging the electric power from the storage battery; and upon determining that the error indicates that the electric power is surplus, procuring electric power by one of third and fourth methods with a lower electric power procurement cost or carbon dioxide emission, by determining which of the third and fourth methods has the lower electric power procurement cost or carbon dioxide emission, the third method being a method of reducing an amount of electric power generated by the power generator, the fourth method being a method of charging the storage battery with surplus electric power and reducing a purchase amount of electric power.

* * * * *